3,694,138
DYEING HUMAN HAIR WITH N,N-DIARYL ALKYLENEDIAMINE OXIDATION DYE COMPOSITIONS
Gregoire Kalopissis, Paris, and Andree Bugaut, Bologne-sur-Seine, France, assignors to Société Anonyme dite: LOREAL, Paris, France
No Drawing. Filed July 31, 1969, Ser. No. 846,577
Int. Cl. A61k 7/12
U.S. Cl. 8—10.2      3 Claims

ABSTRACT OF THE DISCLOSURE

N,N'-diaryl alkylenediamine oxidation dye compositions that are suitable for dyeing live human hair are disclosed.

SUMMARY OF THE INVENTION

It is well known that keratinic fibers, and in particular human hair, may be colored by compositions containing oxidation dyes, and in particular aromatic ortho- or para-diamines and ortho- or para-aminophenols which are generally referred to as "oxidation bases." These bases are capable of forming pigments as a consequence of oxidative coupling either between themselves or with color modifiers or couplers which may be, in particular, aromatic meta-diamines or meta-aminophenols.

The present invention relates to a new class of bases which may be used for dyeing keratinic fibers.

It is the object of the present invention to provide as a new article of manufacture a dyeing composition for keratinic fibers, and particularly for human hair, which is characterized by the fact that it contains, possibly in association with one or more couplers, at least one base having the following general formula:

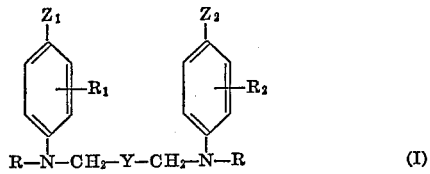

in which:

$Z_1$ and $Z_2$, which may be identical or different, represent hydroxy or $NHR_3$, in which $R_3$ represents hydrogen or a lower alkyl having 1–6 carbon atoms;

$R_1$ and $R_2$, which may be identical or different, each represent hydrogen, halogen or alkyl;

R represents hydrogen, alkyl, hydroxyalkyl or aminoalkyl in which the amino constituent may be substituted;

Y represents a member selected from the group consisting of the following:

$$-(CH_2)_n-$$
$$-(CH_2)_{n'}-O-(CH_2)_{n'}-$$
$$-(CH_2)_{n'}-CHOH-(CH_2)_{n'}-, \text{ and}$$
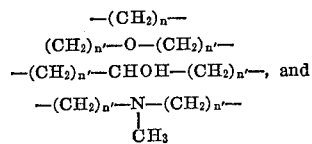

and $n$ is a whole number between 0 and 8 inclusive and $n'$ is a whole number between 0 and 4 inclusive.

It will be appreciated that the compounds of Formula I may be used in the form of their acid addition salts.

Among the bases having general Formula I which are particularly useful are:

N,N'-bis-[(4-amino)phenyl]-tetramethylenediamine,
N,N'-bis-(β-diethylaminoethyl) N,N'-[(4-amino)-phenyl]-tetramethylenediamine, and
N-(4-hydroxy)phenyl N'-[(4'-amino)phenyl]-ethylenediamine.

Among the couplers which may be advantageously used with the bases responding to Formula I are:

meta-aminophenol,
meta-phenylene diamine,
meta-diamino-anisole,
2,4-dichloro-α-naphthol,
3-carbamyl-methyl-amino-6-methyl-phenol, and
3-carbamyl-methyl-amino-phenol.

The concentration of the Formula I base in the hair dyeing compositions according to the invention is between 0.1% and 12% by weight.

When couplers are used in association with the bases according to Formula I the ratio of the concentration of the base to that of the coupler may vary within broad limits but an excess of coupler is preferably used.

The coloring compositions according to the invention may contain other dyes which may be used under the same conditions such as direct dyes, for example, azo or anthraquinone dyes, or dyes obtained by the oxidation of other bases than those listed above. These bases may be used in association with couplers.

The compositions according to the invention may also contain wetting agents, dispersing agents, penetrating agents, and any other ingredients conventionally used in dyeing hair. They may take the form of an aqueous solution, a cream or a gel.

The coloring compositions of this invention are generally used in a conventional manner at an alkaline pH, preferably between 8 and 10, and are applied to the hair in the presence of an oxidizing solution that may be used on the hair and which is preferably a solution of hydrogen peroxide.

It is also an object of the present invention to provide a method of coloring hair which is characterized by the fact that, after having added hydrogen peroxide thereto, a coloring composition such as the one defined above is applied to the hair. This composition is rendered alkaline by adding for example ammonia, before it is applied to the hair. The hair is then rinsed, shampooed and dried.

A further object of the present invention is to provide a method of preparing symmetrical N,N'-diaryl-α,ω-alkylene-diamines having the formula:

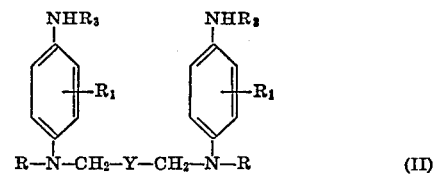

The first step of this process is to condense, preferably in a dimethylformamide medium, a dihalogeno-hydrocarbon having the formula $X-CH_2-Y-CH_2-X$ (in which X indicates a halogen atom) on an alkaline or alkaline earth salt of an N-acetyl N'-arylsulfonyl para-phenylene diamine having Formula A, which produces a compound B, which may then be totally hydrolyzed in a second step, using hot hydrochloric acid, when it is desired to obtain a compound in which R is a hydrogen atom, that is to say having Formula III. When it is desired to obtain a compound in which R is not a hydrogen atom, compound B is first subjected to a selective hydrolysis of its arylsulfonyl groups, using cold sulfuric acid, after which the compound C thus obtained is reacted with a compound R'X (in which X designates a halogen and R' has the significance given for the radical R, except for hydrogen) so as to obtain a compound D which is deacetylated by hydrolysis with hot hydrochloric acid. This yields a compound having Formula IV. This group of reactions is diagrammatically represented below.

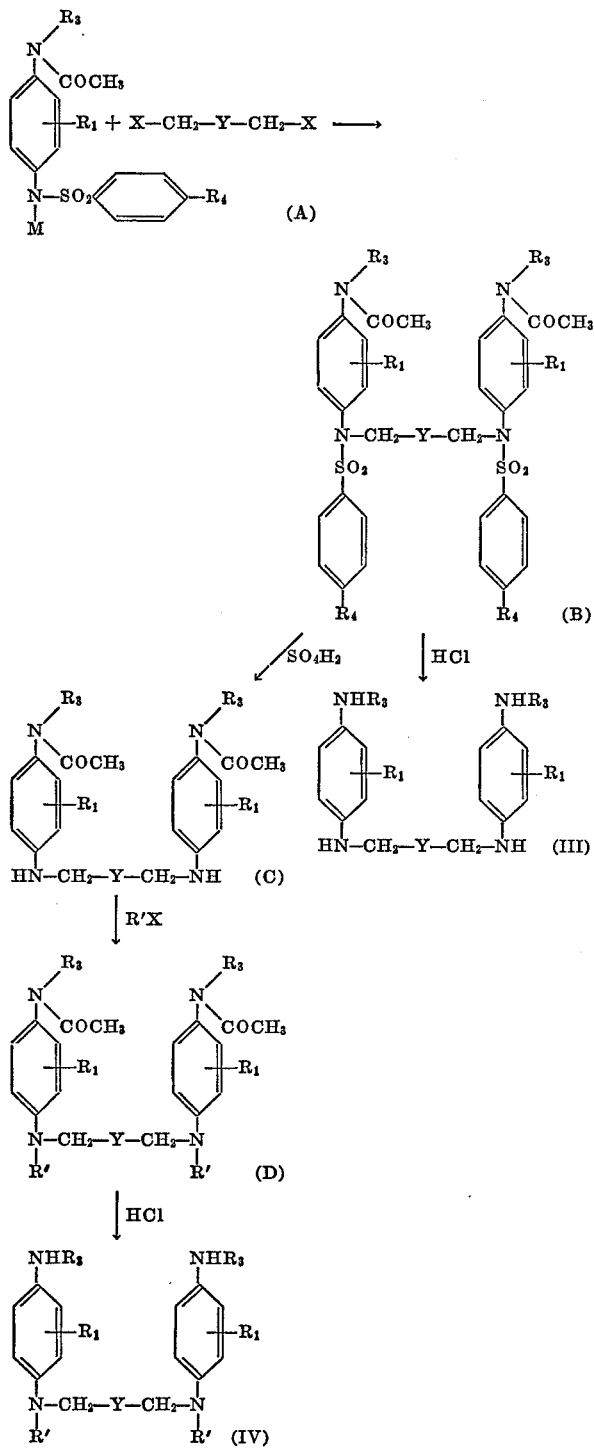

In the formulas shown thereon $R_1$, $R_3$, and Y have the significance given for the compounds of Formula I, M represents an alkaline, such as Na, K or Li, or alkaline earth metal, such as Mg, Ca or Ba, R' designates an alkyl, hydroxyalkyl or aminoalkyl group which may be substitued at the nitrogen, and $R_4$ represents either hydrogen or a methyl or nitro group.

Yet another object of the invention is to provide a new method of preparing compounds having Formula I in which the molecule is asymmetric, that is to say in which at least one of the two groups of substituents formed by $R_1$ and $R_2$, on the one hand, and $Z_1$ and $Z_2$, on the other hand, comprises different radicals. In this process:

(1) When $Z_1$=OH and $Z_2$=$NHR_3$, a para chloronitrobenzene having Formula E set forth below is condensed in a first step on a para-[N-($\omega$-aminoalkyl)]-amino anisole having Formula F. The product G which is obtained in this manner is then subjected to conventional reduction of the $NO_2$ group (for example by means for tin in a hydrochloric medium). This leads to a compound H which may then be directly treated with hydrobromic acid when a compound V which has a primary amine function is to be obtained. If such is not the case, the compound H is first treated with a halogenated derivative $R''_3X$ (in which $R''_3$ designates a lower alkyl and X represents a halogen), before liberating the phenol function by using hydrobromic acid.

This produces a compound V'. This group of reactions is illustrated in the table below in which R" represents a hydrogen atom or an alkyl radical, while $R_1$, $R_2$ and Y have the significances indicated for the compounds of Formula I:

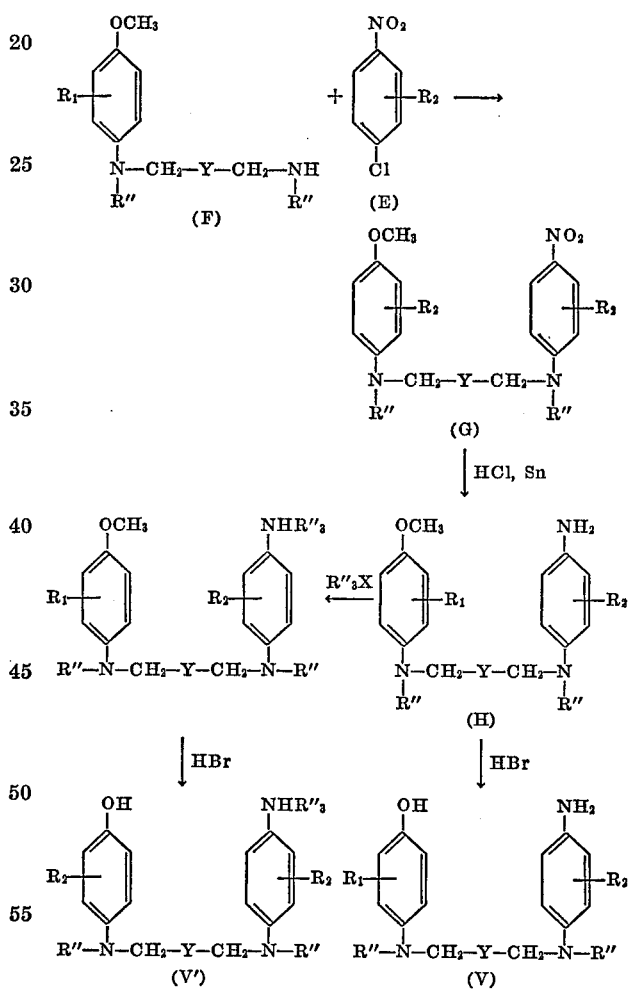

(2) When $Z_1$ and $Z_2$ represent two amino groups which may be identical or different, which situation may be represented by $Z_1$=$NHR_3$ and $Z_2$=$NHR'_3$, a compound having the formula J (obtained in accordance with the process described in Luxembourg application No. 49,213 of July 30, 1965) is condensed, preferably in a dimethyl formamide medium, on a compound having formula K, after which the resulting compound L may be subjected to complete hydrolysis with hot hydrochloric acid if it is desired to obtain a compound in which R=H. Alternatively, the compound L may be subjected to selective hydrolysis with sulfuric acid, which produces a compound M, which may then be reacted with a halogenated derivative R'X. The resulting compound N when subjected to hydrolysis with hydrochloric acid yields a compound VII. This group of reactions is illustrated in the table following, in which $R'_3$ represents hydrogen or lower alkyl, while $R_1$, $R_2$, $R_4$, $R'$, Y, X and M have the significances hereinbefore indicated.

in which $R_1$ represents hydrogen, halogen or alkyl, and Ra represents aminoalkyl.

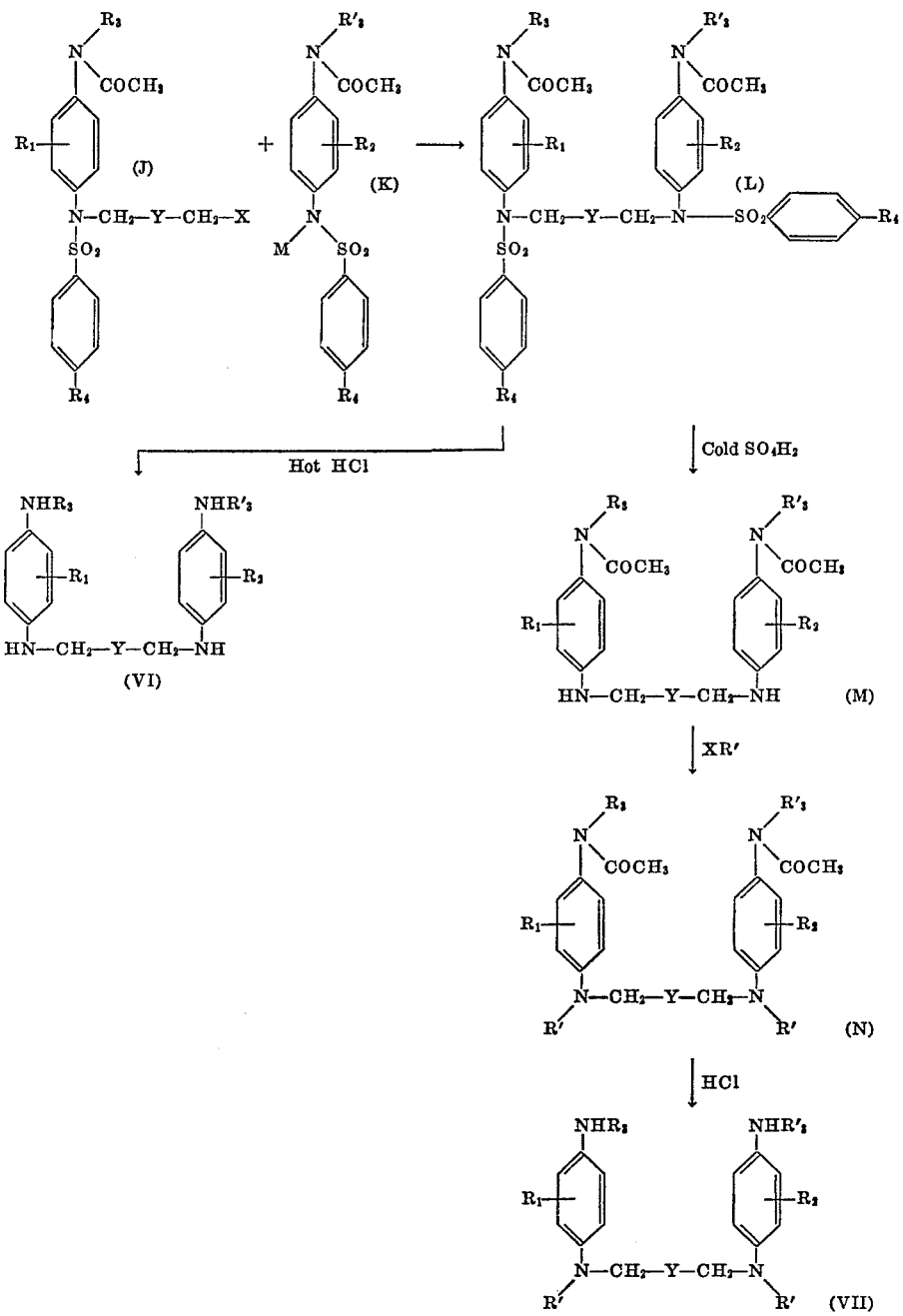

It is a further object of the present invention to provide a certain number of new chemical compounds which fall within general Formula I. More specifically it is an object of the invention to provide as new articles of manufacture:

(1) Those compounds of Formula I in which the molecule is asymmetric, that is to say in which at least one of the two groups of substituents consisting of $R_1$ and $R_2$ on the one hand and $Z_1$ and $Z_2$ on the other hand consists of different radicals. In the following description these compounds are referred to as "asymmetric compounds."

(2) Those compounds having the following Formula Ia:

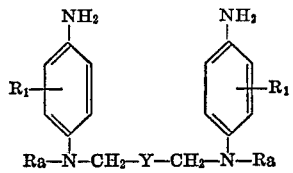

(3) Those compounds having Formula Ib:

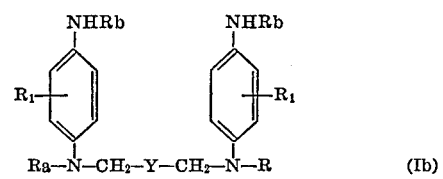

in which R represents hydrogen, alkyl, hydroxyalkyl, or aminoalkyl, in which the amino may be substituted, $R_1$ represents hydrogen, halogen or alkyl and Rb represents a lower alkyl.

The following examples illustrate different embodiments of the invention. These examples are given purely by way of illustration. The percentages are given by weight and temperatures in degrees Celsius.

EXAMPLES OF PREPARATION

EXAMPLE I

Preparation of N,N'-bis[(4-amino)phenyl]tetramethylenediamine tetrahydrochloride by means of the following reactions:

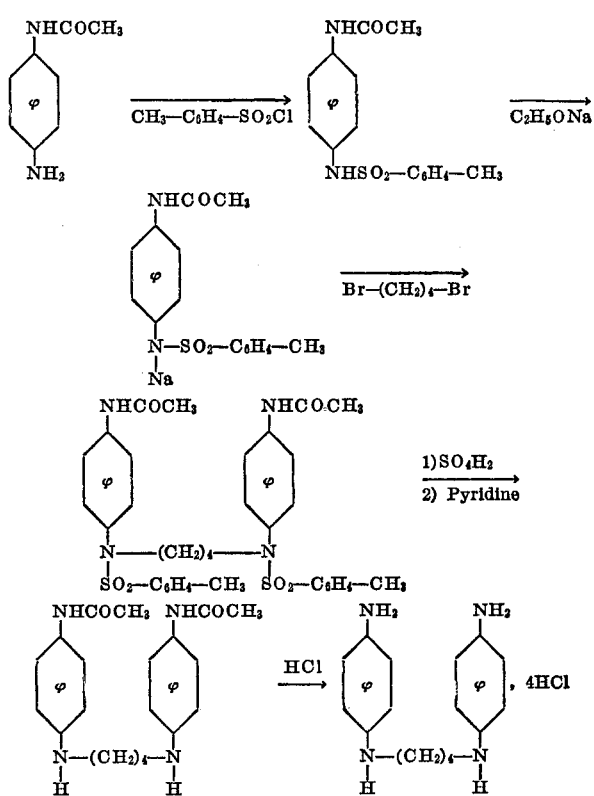

First step.—Preparation of 1-N-paratoluenesulfonyl-amino-4-acetylamino-benzene

A solution containing 297 g. (1.92 mole) of para acetamino aniline in a liter of pyridine is mixed at between 30 and 40° with 475 g. (2.5 mole) of paratoluenesulfochloride. The reaction mixture is kept for 2 hours at 50°. It is then poured over 4 kg. of cracked ice to which 500 cm.³ of concentrated hydrochloric acid has been added. Drying yields 435 g. of the crude product, which, after recrystallization in alcohol, melts at 184°.

Second step.—Preparation of the sodium derivative of 1-N-paratoluenesulfonylamino-4-acetylamino benzene 1.15 moles of the sulfonamide obtained in the first step are added to a solution of sodium ethylate obtained by adding 66 g. of sodium to 1750 cm.³ of absolute alcohol. After heating this at reflux for half an hour, drying yields 375 g. of the sodium derivative which is washed with a little hot absolute alcohol.

Third step.—Preparation of N,N'-bis-(paratoluenesulfonyl) N,N' - bis - [(4 - acetylamino)phenyl]tetramethylenediamine 24 cm.³/ (0.2 mole) of 1,4-dibromobutane are added slowly to a solution of 130 g. (0.4 mole) of the sodium derivative obtained in the second step, which has first been heated to 95°, and mixed with 390 cm.³ of dimethylformamide.

After the reaction mixture has been kept at 95° for an hour, it is poured into four liters of ice water, after which drying yields 90 g. of the desired product which, after recrystallization in acetic acid, melts at 260°.

| Analysis | Calculated for $C_{34}H_{38}N_4O_6S_2$ | Found |
|---|---|---|
| C, percent | 61.63 | 61.72 |
| H, percent | 5.74 | 5.65 |
| N, percent | 8.46 | 8.55-8.66 |
| S, percent | 9.66 | 9.60-9.80 |

Fourth step.—Preparation of N,N'-bis-[(4-acetylamino) phenyl] tetramethylenediamine 84 g. (0.12 mole) of N,N'-(paratoluenesulfonyl) N,N'-bis-[(4-acetylamino) phenyl] tetramethylenediamine are dissolved in 330 cm.³ of concentrated sulfuric acid at 0°. The reaction mixture is left to stand for 24 hours at the ambient temperature. It is then poured over 2 kg. of ice. Drying yields the desired product in the form of a sulfate. This sulfate is treated with pyridine so as to produce 34.2 g. of N,N'-[(4-acetylamino) phenyl] tetramethylenediamine which melts at 244°.

Fifth step.—Preparation of N,N'-bis-[(4-amino) phenyl] tetramethylenediamine tetrahydrochloride 16 g. (0.0454 mole) of N,N' - bis - [(4 - acetylamino) phenyl] tetramethylenediamine are added to 200 cm.³ of concentrated hydrochloric acid and 100 cm.³ of acetic acid. The reaction mixture is kept at reflux for 4 hours. After cooling, drying yields 17 g. of N,N'-bis-[(4-amino) phenyl] tetramethylenediamine tetrachlorhydride, which melts and decomposes at 245°.

| Analysis | Calculated for $C_{16}H_{26}N_4Cl_4$ | Found |
|---|---|---|
| C, percent | 46.15 | 46.40-46.19 |
| H, percent | 6.25 | 6.40-6.35 |
| N, percent | 13.56 | 13.46-13.54 |

EXAMPLE 2

Preparation of N,N' - bis - (β-hydroxyethyl)N,N'-[(4-amino) phenyl] tetramethylenediamine tetrahydrochloride, according to the following process:

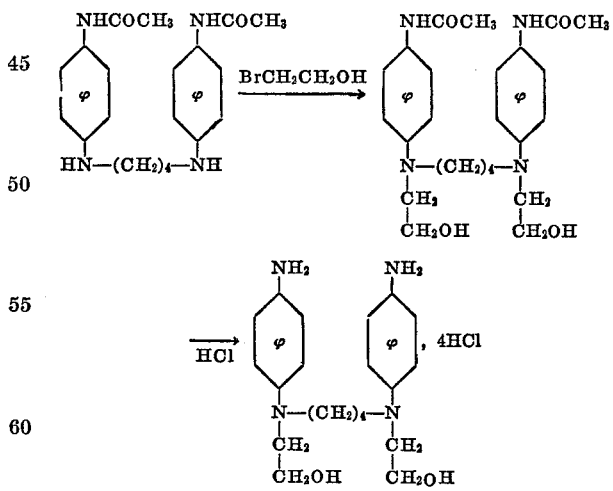

First step.—Preparation of N,N'-bis-(β-hydroxyethyl) N,N'-bis-[(4 - acetylamino) phenyl] tetramethylenediamine 4.5 g. (0.0125 mole) of N,N'-[(4-acetylamino) phenyl] tetramethylenediamine are heated for two hours at 95° with 18 cm.³ (0.1 mole) of 70% glycol hydrobromide, 9 cm.³ of water and 5 g. (0.05 mole) of calcium carbonate. This reaction mixture is poured into 100 cm.³ of normal hydrochloric acid, and alkalized with ammonia. Drying yields 4.5 g. of N,N'-bis-(β-hydroxyethyl) N,N'-bis- [(4-acetylamino) phenyl] tetramethylenediamine which, after recrystallization in a dimethylformamide-water mixture, melts at 240°.

| Analysis | Calculated for $C_{24}H_{34}N_4O_4$ | Found |
|---|---|---|
| C, percent | 65.16 | 65.22–65.05 |
| H, percent | 7.69 | 7.61–7.81 |
| N, percent | 12.67 | 12.72–12.90 |

Second step.—Preparation of N,N'-bis-(β-hydroxyethyl) N,N'-bis-[(4 - amino) phenyl] tetramethylenediamine tetrahydrochloride 30.6 g. (0.0695 mole) of N,N'-bis-(β-hydroxyethyl) N,N' - bis - [(4 - acetylamino) phenyl] tetramethylenediamine are dissolved in 200 cm.³ of concentrated hydrochloric acid and the reaction mixture is kept at reflux for an hour. It is then vacuum dried and the resulting crude product recrystallized with alcohol. The result is 34.5 g. of N,N' - bis - (β - hydroxyethyl) N,N'-bis-[(4-amino) phenyl] tetramethylenediamine tetrahydrochloride, which melts and decomposes at 230°.

EXAMPLE 3

Preparation of N,N'-bis-[(4-methylamino) phenyl] tetramethylenediamine tetrahydrochloride, according to the following diagram:

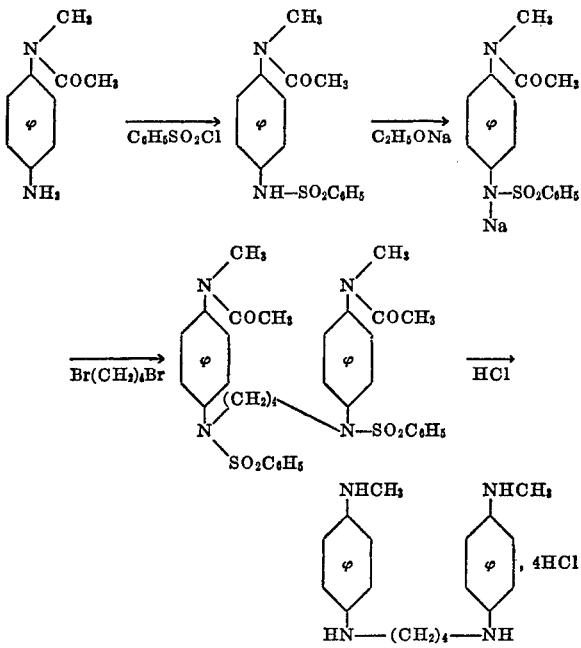

First step.—Preparation of 1-(N-methyl, N-acetyl)amino-4-N-benzenesulfonyl-amino benzene This product is prepared by a process identical to the one described in the first step of Example 1, except that the paratoluenesulfochloride is replaced by benzene sulfochloride. After recrystallization in ethyl alcohol the product melts at 178.5° C.

Second step.—Preparation of sodium derivative of 1-(N-methyl, N - acetyl)amino-4-N-benzene - sulfonylaminobenzene The sodium derivative is obtained by treating the sulfonamide prepared as above with an alcoholic solution of sodium ethylate following a procedure identical to the one described in the second step of Example 1.

Third step.—Preparation of N,N'-bis-[4-(methyl-acetyl-amino) phenyl] - N,N' - bis-[(benzenesulfonyl)] tetramethylenediamine 1.3 cm.³ (0.01 mole) of 1,4 dibromo butane are added slowly to a solution of 6.52 g. (0.02 mole) of the sodium derivative described above in 20 cm.³ of dimethylformamide, which has first been brought to 95°. After keeping the reaction mixture at 95° for an hour it is poured over 200 cm.³ of ice water. Drying yields 6.1 g. of the crude product which, after washing with a normal solution of NaOH and then with water is recrystallized in acetic acid. It melts at 235°.

Fourth step.—Preparation of N,N' - bis - [4 - (methylamino)phenyl] tetramethylenediamine tetrahydrochloride 3.5 g. (0.0053 mole) of N,N'-bis-[4-(methyl-acetylamino)] phenyl N,N' - bis - [(benzenesulfonyl)] tetramethylenediamine are added to 35 cm.³ of concentrated hydrochloric acid and the reaction mixture is kept at reflux for 3 hours. After cooling, drying yields 2 g. of N,N'-bis - [4 - (methylamino)phenyl] tetramethylenediamine tetrahydrochloride, which melts and decomposes between 228 and 230°.

Molecular weight calculated for $C_{18}H_{30}N_4Cl_4$: 444
Molecular weight found by potentiometric measurement: 445.

EXAMPLE 4

Preparation of N-[(4-amino)phenyl] N'-[(4-amino-3-methyl)phenyl]-N,N'-ethylenediamine tetrahydrochloride in accordance with the following process:

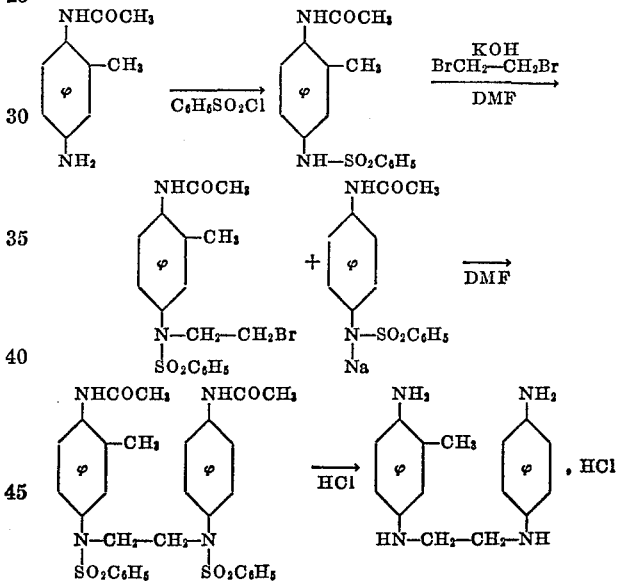

First step.—Preparation of 1-N-acetylamino-4-N-benzenesulfonylamino toluene 46.8 cm.³ (0.366 mole) of benzenesulfochloride are added at between 40 and 50° to a solution containing 50 g. (0.305 mole) of 1-acetylamino 4-amino toluene in 175 cm.³ of pyridine. The reaction mixture is kept at this temperature for two hours and then poured over 700 g. of cracked ice to which 40 cm.³ of concentrated hydrochloric acid have been added. Drying yields 84 g. of a crude product which, after recrystallization in alcohol, melts at 167°.

Second step.—Preparation of 1-N-acetylamino-4[N-(β-bromo-ethyl, N-benzenesulfonyl)]amino toluene 3.46 g. (0.025 mole) of 85% potassium hydroxide in solution in 2 cm.³ of water and 8 cm.³ of absolute ethyl alcohol are added to a solution of 15.2 g. (0.05 mole) of 1-acetylamino-N-benzenesulfonyl - 4 - amino toluene in 60 cm.³ of dimethylformamide. The reaction mixture is brought to 90° and 8.66 cm.³ (0.1 mole) 1,4 dibromoethane are rapidly added. The mixture is heated in a boiling water bath for an hour. After cooling, 600 cm.³ of ice water are added, and drying yields 13 g. of the crude product. This is purified by washing it with a 2 N sodium hydroxide solution and then with water. After recrystallization in alcohol, it melts at 138.5°.

| Analysis | Calculated for $C_{17}H_{19}N_2O_3BrS$ | Found |
|---|---|---|
| N, percent | 6.81 | 6.88–6.92 |
| S, percent | 7.78 | 7.89–7.85 |

Third step.—Preparation of 1-N-acetylamino-4-N-benzenesulfonylaminobenzene

This product is prepared by a process identical to the one described in the first step of Example 1 except that the paratoluenesulfochloride is replaced by benzensulfochloride. After recrystallization in ethyl alcohol the products melts at 161°.

Fourth step.—Preparation of sodium derivative of 1-acetylamino-4-N-benzenesulfonyl-amino benzene This sodium derivative is obtained by treating the sulfonamide prepared as above with an alcoholic solution of sodium ethylate in a process identical to the one described in the second step of Example 1.

Fifth step.—Preparation of N-[(4-acetylamino) phenyl] N'-[(4-acetylamino-3 methyl) phenyl] N,N'-(benzenesulfonyl) ethylenediamine 4.11 g. (0.01 mole) of the brominated derivative prepared during the second step and 3.12 g. (0.01 mole) of the sodium derivative prepared during the fourth step are dissolved in 35 cm.³ of dimethylformamide at 120°. The reaction mixture is kept at this temperature for 2 hours. It is then cooled and 100 cm.³ of water are added. Drying yields 5.5 g. of the crude product which, after washing with a normal sodium hydroxide solution, and then with water, is recrystallized in acetic acid. It melts at 220°.

Sixth step.—Preparation of N-[(4-amino) phenyl] N'-[(4-amino-3-methyl) phenyl] ethylenediamine tetrahydrochloride 5 g. (0.008 mole) of N,N'-benzenesulfonyl N-[(4-acetylamino)-phenyl] N'[(4-acetylamino-3-methyl) phenyl] ethylene diamine are added to 50 cm.³ of concentrated hydrochloric acid and the reaction mixture is kept at reflux for 3 hours. After cooling, drying yields 2.3 g. of the desired tetrahydrochloride, which melts and decomposes between 235 and 240°.

Molecular weight calculated: $C_{15}H_{24}N_4Cl_4$: 402.
Molecular weight found by potentiometric measurement: 398.

EXAMPLE 5

Preparation of N,N'-bis-[β-(diethylamino) ethyl] N,N'-bis-[(4-amino) phenyl] tetramethylenediamine tetrahydrochloride This compound is prepared by the following process:

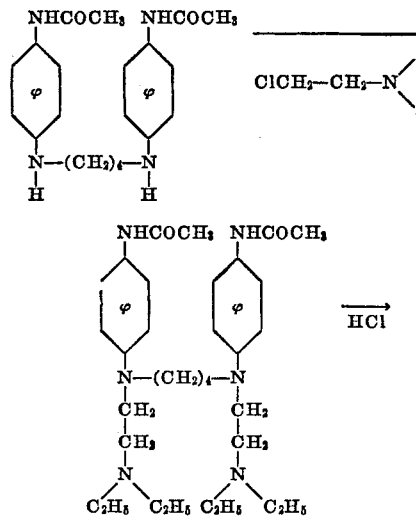

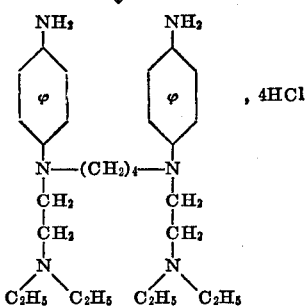

First step.—Preparation of N,N'-bis-[β-(diethylamino) ethyl] N,N'-bis-[4-acetylamino) phenyl] tetramethylenediamine 0.85 mole (115 g.) of diethylaminoethyl chloride is added little by little to a solution of 0.085 mole (30 g.) of N,N'-bis-[(4 - acetylamino) phenyl]-tetramethylenediamine in 300 cm.³ of nitrobenzene at 150°. The reaction mixture is kept at 150° for one hour. After cooling, drying yields the desired product in the form of its dihydrochloride. This crude dihydrochloride is treated with a normal sodium hydroxide solution and drying yields 28 g. of N,N'-bis[β-(diethylamino) ethyl]-N,N'-bis-[(4-acetylamino) phenyl] tetramethylenediamine which, after recrystallization in chlorobenzene, melts at 145°.

| Analysis | Calculated for $C_{32}H_{52}N_6O_2$ | Found |
|---|---|---|
| C, percent | 69.56 | 69.24–69.46 |
| H, percent | 9.41 | 9.23–9.47 |
| N, percent | 15.21 | 15.12–15.33 |

Second step.—Preparation of N,N'-bis-[β(diethylamino) ethyl] - N,N' - bis-[4' - amino phenyl)]tetramethylene diamine tetrahydrochloride 0.05 mole (27.7 g.) of N,N'-bis-[β-(diethylamino)ethyl], N,N'-bis - [(4-acetylamino)phenyl]tetramethylenediamine is dissolved in 100 cm.³ of concentrated hydrochloric acid and the reaction mixture is kept at reflux for three hours. It is then vacuum dried and the crude product thus obtained is recrystallized in a mixture of acetone and alcohol. This yields 27 g. of N,N'-bis-[β-(diethylamino) ethyl]-N,N'-bis-[(4 - amino)phenyl]tetramethylene diamine tetrahydrochloride which melts and decomposes at 260°.

EXAMPLE 6

N-[(4-hydroxy)phenyl]-N'-[(4-amino)phenyl] ethylenediamine trihydrobromide

This compound is prepared by the following process:

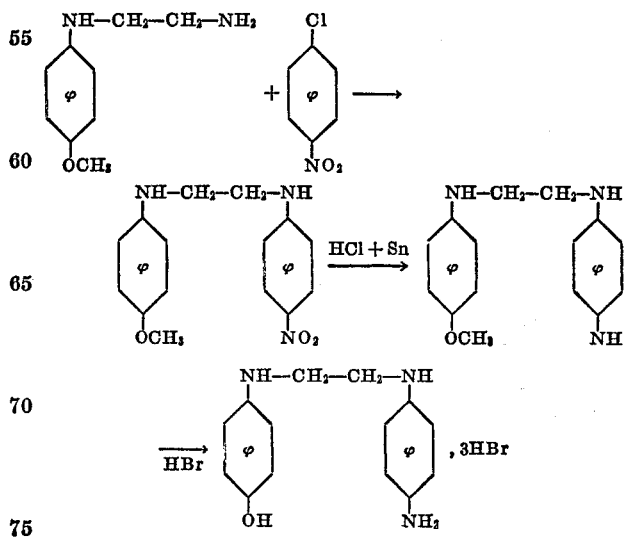

13

First step.—Preparation of N-[(4-methoxy)phenyl]-N'-[(4-nitro)phenyl]-ethylenediamine A mixture containing 0.1 mole (223 g.) of N-β-aminoethyl paraanisidine and 0.447 mole (70.6 g.) of parachloronitrobenzene is heated for five hours at 120° After cooling the reaction mixture is poured into a liter of water and drying yields a crude product. This product after recrystallization in chlorobenzene, produces 80 g. of N-[(4 - methoxy)phenyl]-N'-[4 - nitro phenyl]ethylene diamine, which melts at 150°.

| Analysis | Calculated for $C_{15}H_{17}N_3O_3$ | Found |
|---|---|---|
| C, percent | 62.72 | 62.50–62.53 |
| H, percent | 5.93 | 5.79–5.86 |
| N, percent | 14.63 | 14.51–14.68 |

Second step.—Prepaartion of N-[(4-methoxy)phenyl]-N'-[(4-amino)phenyl]ethylenediamine The above nitro derivative is reduced in a conventional manner with hydrochloric acid and tin. After cooling, the reaction mixture, drying yields the desired product in the form of its hydrochloride. This is treated with a sodium hydroxide solution and yields N-[(4-methoxy)phenyl], N'-[(4 - amino)phenyl]ethylene diamine which melts at 58°.

| Analysis | Calculated for $C_{15}H_{17}N_2O_3$ | Found |
|---|---|---|
| O, percent | 70.04 | 70.24–70.20 |
| H, percent | 7.39 | 7.61–7.60 |
| N, percent | 16.34 | 16.47–16.48 |

Third step.—Preparation of N-[(4-hydroxy)phenyl]-N'-[(4-amino)phenyl]ethylenediamine trihydrobromide 0.233 mole (60 g.) of N-[(4 - methoxy)phenyl]-N'-[(4-amino)phenyl]ethylenediamine is heated to reflux in 300 cm.³ of 48% hydrobromic acid. After cooling the reaction mixture, drying yields 85 g. of the trihydrobromide, which melts and decomposes at 280°.

| Analysis | Calculated for $C_{14}H_{17}N_3O,3BrH$ | Found |
|---|---|---|
| C, percent | 34.54 | 34.60–34.80 |
| H, percent | 4.11 | 4.23–4.09 |
| N, percent | 49.39 | 51.10–50.05 |

EXAMPLES OF COLORING COMPOSITIONS

Example 1

The following solution is prepared:

|  | G. |
|---|---|
| N,N'-bis-[(4 - amino)phenyl]tetramethylenediamine hydrochloride | 7 |
| Meta-aminophenol | 0.3 |
| Resorcinol | 0.1 |
| Metadiamino anisosulfate | 0.05 |
| Aqueous ammonium lauryl sulfate solution, the concentration of which is 20% referred to lauryl alcohol | 20 |
| Ethylene-diamino-tetracetic acid, sold under the trademark "TRILON B" | 0.3 |
| 20% ammonia | 10 |
| 40% sodium bisulfite | 1 |
| Water, q.s.p. | 100 |

This solution, when mixed with an equal weight of 6% hydrogen peroxide and applied for 30 minutes to 90% white hair, yields a deep ash blonde.

14

Example 2

The following solution is prepared:

|  | G. |
|---|---|
| N-[(4-amino)phenyl]-N'-[(4 - amino - 3 - methyl)phenyl]ethylenediamine tetrahydrochloride | 0.6 |
| 2,4-diamino anisole | 0.65 |
| Ammonium lauryl sulfate containing 40% lauryl alcohol | 20 |
| Ethylene-diamino-tetraacetic acid sold under the trademark "TRILON B" | 0.3 |
| 40% sodium bisulfite solution | 1 |
| Ammonia at 22° Bé. | 10 |
| Water, q.s.p. 100 cc. | |

This solution, when mixed with an equal weight of 6% hydrogen peroxide and applied for 30 minutes to 100% white hair, produces a grayish blue.

Example 3

The following solution is prepared:

|  | G. |
|---|---|
| N,N'-bis-[(4-methylamino) phenyl]-tetramethylenediamine tetrahydrochloride | 1.11 |
| 2,4-diamino anisole | 0.65 |
| Ammonium lauryl sulfate containing 40% lauryl alcohol | 20 |
| Ethylene-diamino-tetraacetice acid, sold under the trademark "TRILON B" | 0.3 |
| 40% sodium bisulfite solution | 1 |
| Ammonia at 22° Bé. | 10 |
| Water, q.s.p. 100 cm.³ | |

This solution, when mixed with an equal weight of 6% hydrogen peroxide and left for 30 minutes on 100% white hair, produces a slightly greenish gray.

Example 4

The following solution is prepared:

|  | G. |
|---|---|
| N-[(4-hydroxy) phenyl] - N' - [(4-amino) phenyl] ethylenediamine trihydrobromide | 10 |
| Meta-diamino anisole sulfate | 0.5 |
| Resorcinol | 0.1 |
| Ammonium lauryl sulfate containing 20% lauryl alcohol | 20 |
| Ethylene-diamino-tetraacetic acid sold under the trademark "TRILON B" | 0.3 |
| 20% ammonia | 10 |
| 40% sodium bisulfite | 1 |
| Water, q.s.p. | 100 |

This solution when mixed with an equal weight of 6% hydrogen peroxide and left for 30 minutes on 80% white hair, produces a smoky blonde.

Example 5

The following solution is prepared:

|  | G. |
|---|---|
| N,N'-bis-[(diethylamino) ethyl] N,N' - bis - [(4-amino) - phenyl] tetramethylenediamine tetrahydrochloride | 6 |
| Metadiamino anisole sulfate | 0.10 |
| Resorcinol | 0.05 |
| Ammonium lauryl sulfate containing 20% lauryl alcohol | 20 |
| Ethylene-diamino-tetraacetic acid sold under the trademark "TRILON B" | 0.3 |
| 20% ammonia | 10 |
| 40% sodium bisulfite | 1 |
| Water, q.s.p. | 100 |

This solution, when mixed with an equal weight of 6% hydrogen peroxide, and applied for 30 minutes to 70% white hair, produces a steel gray.

What is claimed is:

1. A hair dye composition for dyeing live human hair comprising an aqueous alkaline solution having a pH of 8–10 of a dye coupler and a dye compound base selected from the group consisting of a compound having the formula

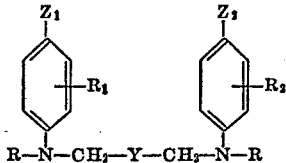

wherein $Z_1$ is selected from the group consisting of $-NH_2$, $-NHCH_3$ and $-OH$, $Z_2$ is selected from the group consisting of $-NH_2$ and $-NHCH_3$, $R_1$ and $R_2$ each independently are selected from the group consisting of hydrogen and methyl, R is selected from the group consisting of hydrogen, hydroxyethyl and diethylaminoethyl and, Y is $-(CH_2)_n-$ wherein $n$ is 0 or 2; and the salt of said compound with an acid selected from the group consisting of hydrochloric and hydrobromic acids; the ratio of said dye compound base to said coupler being less than 1, said dye base compound being present in amounts of 0.1 to 12 percent by weight of said composition.

2. A hair dye comprising a mixture of the hair dye composition of claim 1, and an equal weight of 6% hydrogen peroxide.

3. A method for dyeing hair comprising applying to said hair an effective amount of the hair dye of claim 2, rinsing, shampooing and drying said hair.

References Cited
UNITED STATES PATENTS
2,661,291   12/1953   Slifkin _____ 260—570.8 R X ALBERT T. MEYERS, Primary Examiner
V. C. CLARKE, Assistant Examiner U.S. Cl. X.R.
8—11; 260—570.8 R, 571, 576